Patented Apr. 22, 1947

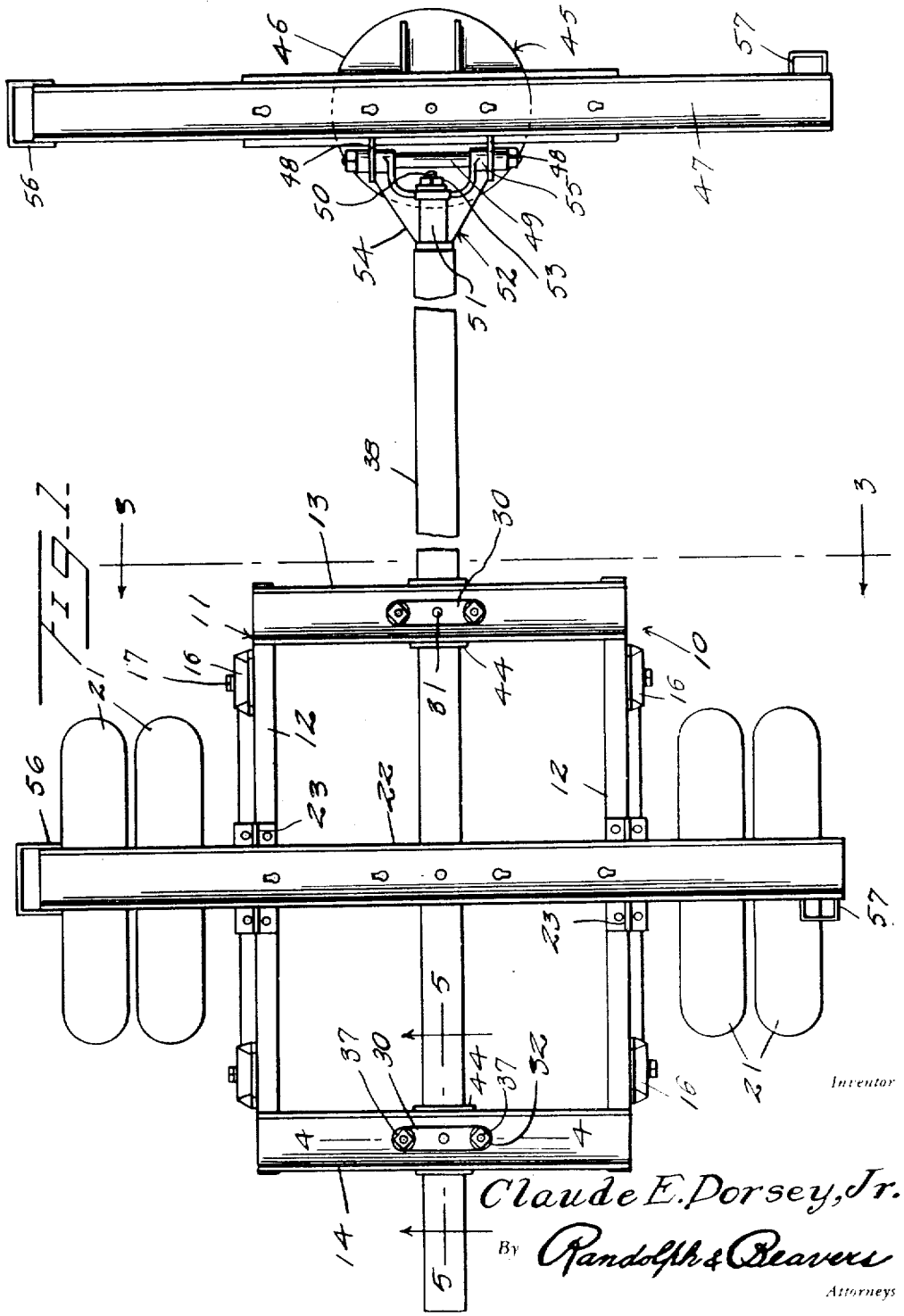

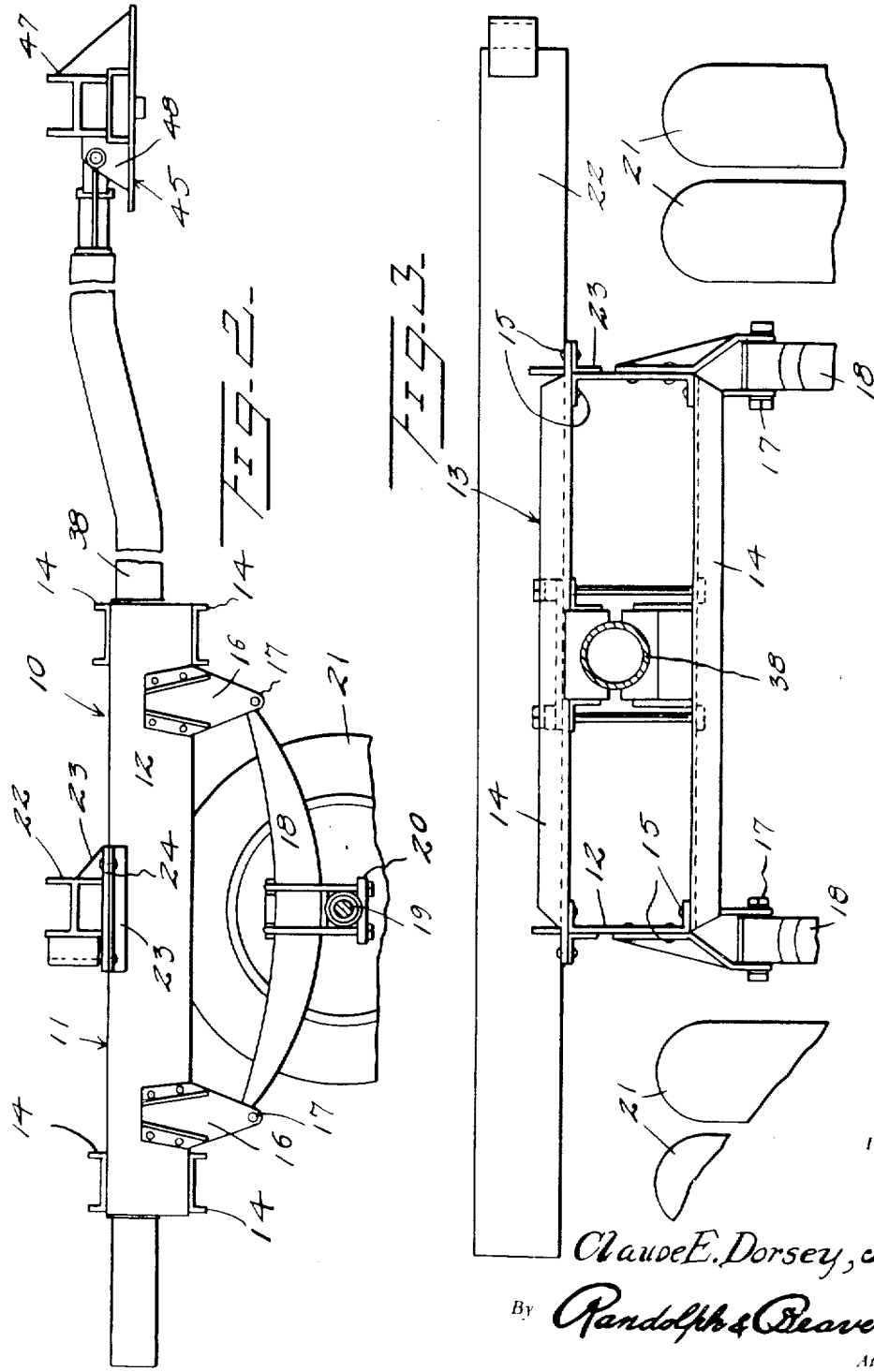

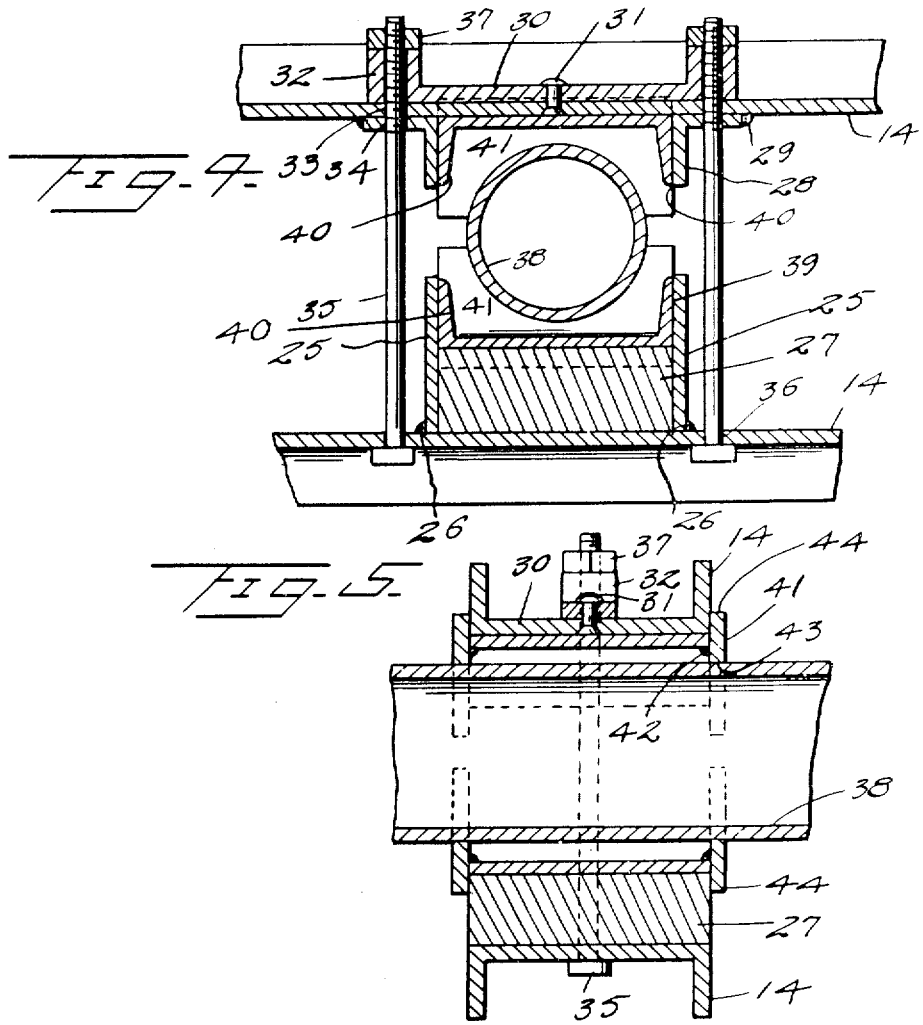

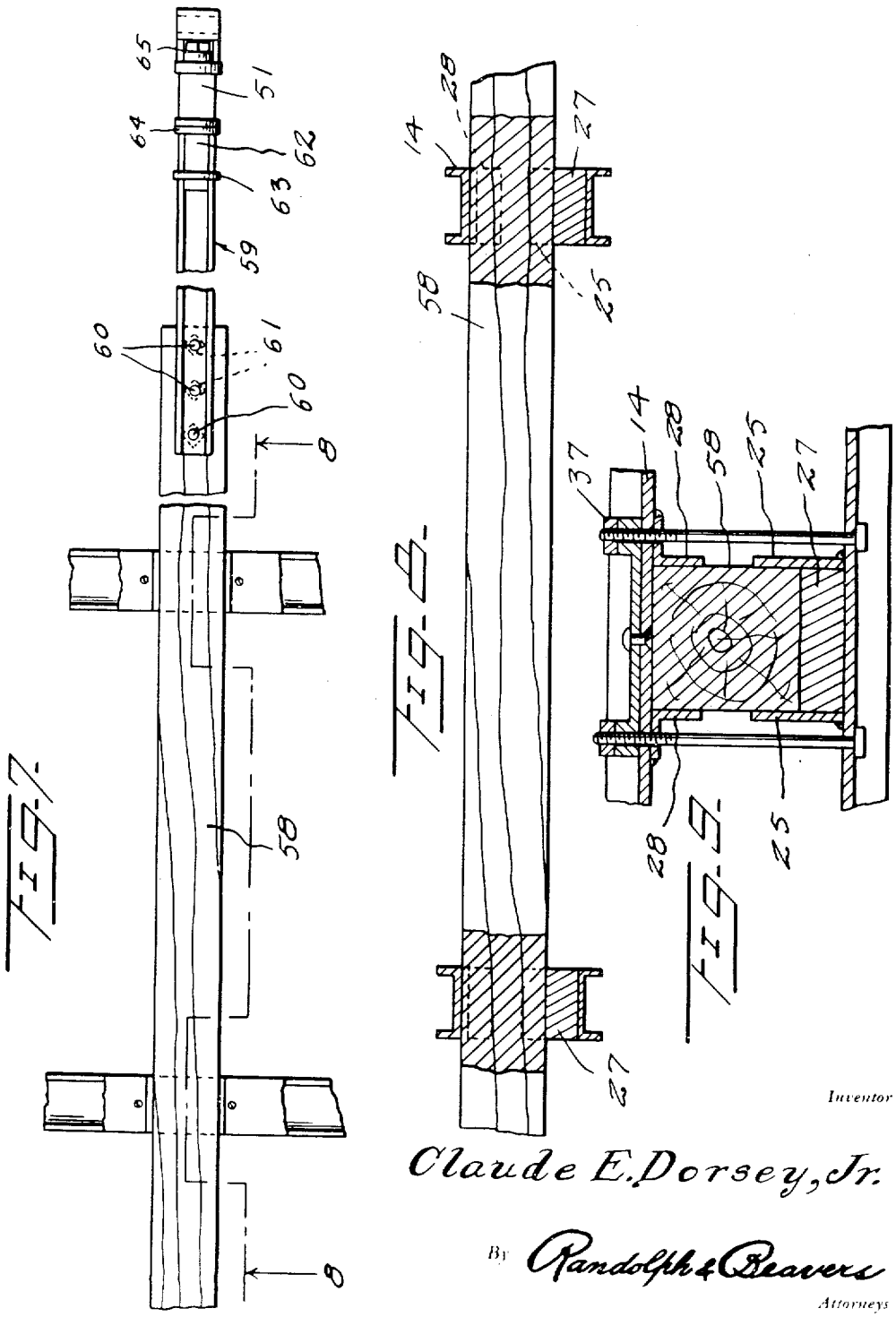

2,419,442

UNITED STATES PATENT OFFICE 2,419,442

LOGGING TRAILER

Claude Eugene Dorsey, Jr., Elba, Ala.

Application February 27, 1946, Serial No. 650,543

5 Claims. (Cl. 280—142)

1

This invention relates to a novel construction of logging trailer and more particularly to an improved means for clamping a coupling pole to the trailer chassis.

More particularly, it is an object of this invention to provide a clamping means by which a wood or metal coupling pole may be detachably and adjustably clamped to the chassis of a logging trailer.

A further object of the invention is to provide a novel means for swivelly connecting the forward end of the coupling pole to a draft vehicle to provide for freedom of movement of the trailer relative to the draft vehicle to compensate for irregularity in the surfaces over which the vehicles are passing.

Other objects and advantages of the invention will hereinafter become more fully apparent from the following description of the drawings, which illustrate the preferred embodiments thereof, and wherein:

Figure 1 is a top plan view showing a log trailer, constructed in accordance with the invention, coupled to a draft vehicle;

Figure 2 is a side elevational view thereof;

Figure 3 is a transverse sectional view taken substantially along a plane as indicated by the line 3—3 of Figure 1;

Figure 4 is an enlarged transverse sectional view taken along the line 4—4 of Figure 1;

Figure 5 is an enlarged longitudinal view taken along the line 5—5 of Figure 1;

Figure 6 is a plan view of one of the clamping inserts;

Figure 7 is a fragmentary horizontal sectional view showing the frame modified to receive a wood coupling pole;

Figure 8 is a longitudinal vertical sectional view taken substantially along the plane of the line 8—8 of Figure 7; and Figure 9 is a view similar to Figure 4 but showing the clamp engaging the wood coupling pole.

Referring more particularly to the drawings, wherein like reference characters designate like or corresponding parts throughout the several views, 10 designates generally the improved logging trailer in its entirety and which includes a chassis frame, designated generally 11. The chassis frame 11 includes corresponding side members 12 and the corresponding front and rear or end

2 members 13. As best seen in Figure 3, the side members 12 are each formed of a channel member and the end members 13 are each formed of two channel beams 14 which are connected by fastenings 15 to the flanges of the channel members 12. The upper channel members 14 open upwardly and the lower channel members 14 open downwardly, as clearly illustrated in Figure 2.

A pair of spring brackets 16 are secured to and depend from each of the side members 12 and are detachably connected at their lower ends by fastenings 17 to the ends of leaf springs 18. The intermediate portions of the leaf springs 18 rest on an axle 19 and are secured thereto by fastenings 20. A pair of wheels, equipped with ground engaging pneumatic tires, is mounted on each end of the axle 19. Said wheels 21, are located outwardly of the side of the frame 11, as seen in Figure 3.

An H-beam 22 is supported on chassis frame 11 and is disposed transversely thereof. Beam 22 is secured to the side members 12 by bracket 23 and fastenings 24. The coupling pole engaging means, as best illustrated in Figures 4 and 5, and which is identical at both front and rear ends of the chassis frame 11, includes the lower channel beams 14 which are provided with spaced upstanding walls 25 which are transversely disposed relatively thereto and which are secured to the webs of the lower channel members 14 in any suitable manner as by welding at 26. A block 27 of any suitable material is clamped between the complementary plates 25 to form a support, as will hereinafter become apparent. The upper channel members 14 are provided with angle members 28 having complementary sides secured to the undersides of the webs thereof as by welding at 29. The depending sides or flanges of the members 28 are spaced the same distance apart as plates 25. As best seen in Figure 4, a bar 30 is secured by a rivet 31 within each of the channel members 14. Bars 30 are each provided with upstanding sleeves 32 at the ends thereof the bores of which align with openings 33 and 34 in the webs of the upper channel members 14 and the horizontal flanges of the angle members 28, respectively. Clamping bolts 35 project upwardly through openings 36 in the lower channel members 14 and each pass through an opening 33, an opening 34 and the bore of a sleeve 32. The upper ends of the clamping bolts 35 are threaded to receive nuts 37 which bear against the upper ends of the sleeves 32. In Figures 1 to 6, the trailer 10 is shown in conjunction with a metal coupling pole 38 which is circular in cross section, as best seen in Figure 4. When the clamping means, as shown in Figures 4 and 5, are employed in conjunction with a pole 38 inserts or adapters 39 are utilized. The adapters 39, as best seen in Figure 6, each comprise a channel member 40 to the ends of which are connected plate 41 in any suitable manner as by welding at 42. The outer edges of the plates 41 are provided with arcuate shaped recesses 43 for receiving the coupling pole 38, as clearly illustrated in Figures 4 and 5. The opposite edges of the plates 41 project beyond the base or webs of the members 40 to form retaining flanges 44. One of the adapters 39 is disposed on the block 27 between the plates 25 with its flanges 44 abutting against the ends of the block 27, as best seen in Figure 5. Similarly, an adapter 39 is disposed between the complementary angle members 28 with its flanges 44 engaging the sides of the upper channel member 14. It will be readily apparent that the coupling pole 38 retains the adapters 39 in applied position, as seen in Figures 4 and 5. The beams 14 are sufficiently resilient so that the nuts 37 can be tightened for clamping the coupling pole 38 between the pairs of adapters 39.

Referring to Figures 1 and 2, a part of the rear end of a draft vehicle is shown at 45 and includes a plate or disc 46 to which an H-beam 47 is suitably secured, intermediate of its ends. The disc 46 is provided with spaced upstanding plates 48 having openings through which a pin or bolt 49 extends and in which the pin or bolt 49 is removably disposed. As best seen in Figure 2, the coupling pole 38 is provided, adjacent its forward end, with an upwardly inclined portion to offset the forward end of the pole 38 upwardly relatively to the rear end thereof. The threaded bolt or shank 50 projects from the forward end of the pole 38 to rotatably receive the sleeve 51 which forms the shank of a swivel 52. The nut 53 engages the outer end of the bolt 50 to retain the swivel 52 in position on the bolt 50. The swivel 52 includes a yoke 54 which extends from the sleeve 51 and has collar portions 55 at the ends thereof which rotatably engage the pin 49 for pivotally connecting the swivel thereto. It will thus be seen that the swivel 52 is pivoted to draft vehicle 45 and swivelly connected to the pole 38 to form a universal connection between the draft vehicle and trailer.

As seen in Figure 2, the H-beams 22 and 47 are disposed at substantially the same level and form the supporting surface for the load to be hauled which may be logs, poles, etc. The ends of the H-beams 22 and 47 are provided with cuffs or loops 56 or 57 to be engaged by flexible means, not shown, such as chains for securing the load on the H-beams 22 and 47. The cuffs 56 project outwardly from the ends of the H-beams while the cuffs 57 project from sides thereof and either or both types may be employed.

Figures 7, 8 and 9 illustrate the use of a coupling pole 58 in lieu of the coupling pole 38. The coupling pole 58 is rectangular in cross section and is ordinarily formed of wood. When the coupling pole 58 is employed the adapters 39 are removed and the pole 58 is disposed between the blocks 27 and the upper channel beams 14 and between the complementary plates 25 and the angle members 28. The pole 58 is clamped at the front and rear of the trailer chassis 11 by tightening the nuts 37. An H-beam 59 has one end thereof resting on the forward end of the pole 58 and fastened thereto by bolts 60 which extend through the web of the beam 59 and through the pole 58 and which are provided with nuts 61. A bolt 62, intended for the same purpose as the bolt 50, projects from the forward end of the beam 59 and is fastened thereto by a loop 63 and a ring 64, or in any other suitable manner desired. The sleeve 51 of the swivel 52 engages the bolt 62 and is retained thereon by retaining means 65 including a nut and washer. The swivel 52 is connected to the rear end 45 of the draft vehicle in the same manner as illustrated in Figures 1 and 2 and as previously described.

It will be understood that except for the modifications heretofore described the logging trailer 10 is identical when used with the coupling pole 58 as when used with the coupling pole 38.

Various modifications and changes are contemplated and may obviously be resorted to without departing from the spirit and scope of the invention as hereinafter defined by the appended claims.

I claim as my invention:

1. In a logging trailer, a chassis comprising a substantially rectangular frame, the ends of the frame each including a pair of vertically spaced channel beams, clamping means disposed between the beams of each pair of beams and substantially intermediate of their ends for receiving and locating a logging pole, and clamping fastenings passing through the beams, adjacent the clamping means, for clamping the pole in the clamping means.

2. In a logging trailer, a chassis comprising a substantially rectangular frame, the ends of the frame each including a pair of vertically spaced channel beams, clamping means disposed between the beams of each pair of beams and substantially intermediate of their ends for receiving and locating a logging pole, clamping fastenings disposed adjacent the clamping means and passing through the beams for clamping the pole in the clamping means, and a cross beam secured to the upper surface of the chassis frame and disposed transversely thereof for supporting a load to be carried by the trailer.

3. In a logging trailer, a chassis comprising a substantially rectangular frame, the ends of the frame each including a pair of vertically spaced beams, clamping means disposed between the beams of each pair of beams and substantially intermediate of their ends for receiving and locating a logging pole, clamping fastenings forming a part of the clamping means and passing through the beams for clamping the pole in the clamping means, a swivel having a tubular shank detachably and rotatably connected to the logging pole, and a yoke extending from the shank and adapted to be pivotally connected to a draft vehicle.

4. In a logging trailer, in combination with a wheeled chassis, a chassis frame having front and rear ends formed of spaced upper and lower cross beams, aligned clamping means carried by the beams and disposed between the complementary upper and lower beams and substantially intermediate of their ends for receiving a coupling pole, and means located adjacent the clamping means, for drawing the complementary upper and lower end beams toward one another for clamping the pole to the chassis frame at the front and rear ends thereof.

5. In a logging trailer, in combination with a wheeled chassis, a chassis frame having front and rear ends formed of spaced upper and lower cross beams, aligned clamping means carried by the beams and disposed between the complementary upper and lower beams and substantially intermediate of their ends for receiving a coupling pole, means, disposed adjacent the clamping means, for drawing the complementary upper and lower end beams toward one another for clamping the pole to the chassis frame at the front and rear ends thereof, and adapters removably mounted in the clamping means for snugly engaging the coupling pole.

CLAUDE EUGENE DORSEY, Jr.

REFERENCES CITED

The following references are of record in the file of this patent:

UNITED STATES PATENTS

| Number | Name | Date |
| --- | --- | --- |
| 1,487,464 | Morrison | Mar. 18, 1924 |
| 2,387,504 | Farr | Oct. 23, 1945 |
| 1,835,436 | Shaw | Dec. 8, 1931 |
| 1,610,083 | Franzen | Dec. 7, 1926 |